N. FURDUY.
CONNECTING DEVICE FOR HOSE.
APPLICATION FILED SEPT. 1, 1916.
1,228,549.
Patented June 5, 1917.
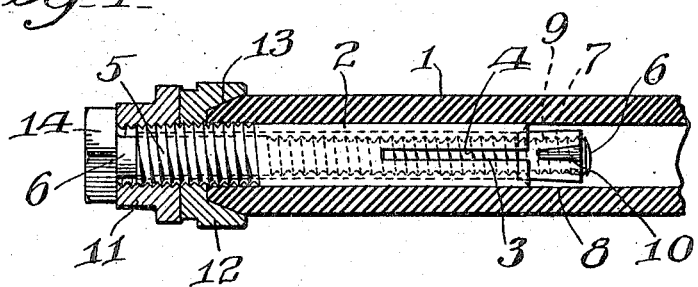
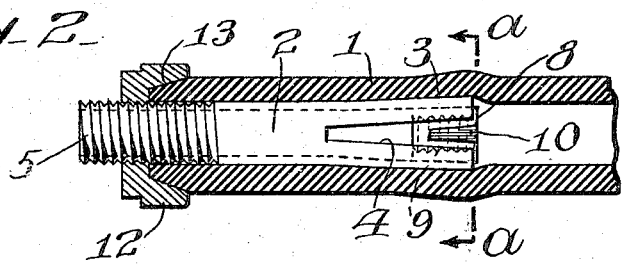
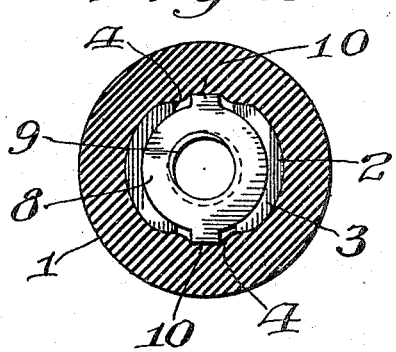 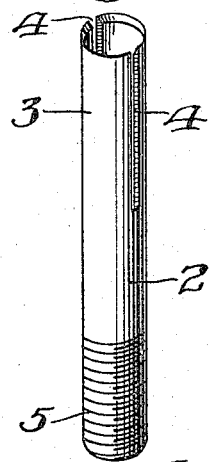 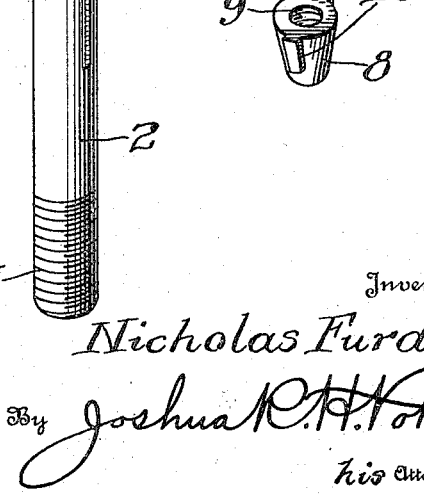
Witnesses
Inventor
Nicholas Furduy,
By Joshua R. H. Potts.
his Attorney

UNITED STATES PATENT OFFICE.

NICHOLAS FURDUY, OF PHILADELPHIA, PENNSYLVANIA.

CONNECTING DEVICE FOR HOSE.

1,228,549.  Specification of Letters Patent.  Patented June 5, 1917.

Application filed September 1, 1916. Serial No. 118,123.

*To all whom it may concern:*

Be it known that I, NICHOLAS FURDUY, a citizen of the United States, residing at Philadelphia, in the county of Philadelphia and State of Pennsylvania, have invented certain new and useful Improvements in Connecting Devices for Hose, of which the following is a specification.

My invention consists of a connecting device for hose, one object being to provide such a connecting device which can be attached to and within the end of a hose and will serve as means for attaching the hose to a threaded nipple, a faucet, or to any other article to which it is desired to join the hose.

A further object is to so construct my improved connecting device that it may be used in connection with high pressure hose, so that it cannot be accidentally dislodged from said hose.

A further object is to so make my invention that it will be of simple construction, and can be manufactured at a reasonably low cost.

These objects, and other advantageous ends which will be described hereinafter, I attain in the following manner, reference being had to the accompanying drawings in which—

Figure 1 is a longitudinal section of a hose having my improved connecting device therein, said view showing how the connecting device is applied to the hose.

Fig. 2 is a view of similar nature to Fig. 1 having my improved connecting device therein as it appears when ready for service.

Fig. 3 is an enlarged sectional view taken on the line *a—a* of Fig. 2.

Fig. 4 is a perspective view of my improved expansion sleeve, and

Fig. 5 is a perspective view of an expansion nipple which I employ.

Referring to the drawings, 1 is the hose into which is inserted an expansion sleeve 2 being bifurcated at its inner end as shown at 3, said bifurcation being formed by slots 4 which are substantially diametrically opposite.

The outer end of the expansion sleeve is screw-threaded externally as shown at 5, and in inserting the expansion sleeve, several of the screw-threads are positioned within the hose for a purpose hereinafter described.

A bolt 6 is used as a tool, and is of such diameter as to freely pass through the expansion sleeve 2. The bolt 6 is threaded at its inner end as shown at 7, and is of such length as to completely pass through the sleeve 2.

An expansion nipple 8 is tapered or frusto-conical in form, and has a screw-threaded hole 9 into which the threaded end of the bolt 6 is designed to fit. The nipple 8 has two ears 10 which are preferably of such height as to form dents or embed themselves in the internal surface of the hose when the nut 6 is turned to draw the small end of the nipple within the inner end of the sleeve 2 to cause the bifurcated end portions of said sleeve to be deflected in the position shown in Fig. 2.

The ears 10, when in this latter position, extend within the slots 4, and since the greater portion of the nipple 8 is of larger diameter than the internal diameter of the sleeve, the said bifurcated portion will be flared or bent outwardly so as to firmly grip the internal surface of the hose 1, so that the sleeve 2 cannot possibly be pulled or forced out.

To facilitate the relative movement between the nipple 8 and the sleeve 2, I preferably employ an internally threaded collar 11 which fits on the outer end of the threaded portion 5 of the sleeve 2, and I also employ a band 12 which is internally threaded to fit the screw-threads 5 and has a tapered recess 13 designed to engage and compress the end of the hose 1.

After the sleeve is inserted within the hose, as above described, the band 12 is screwed on the threaded end of said sleeve until the recess engages the end of the hose, after which the collar 11 is placed thereon and the bolt 6 inserted.

The function of the collar 11 is merely to prevent the head 14 of the bolt 6 from injuring the threads 5 of said sleeve 2, since it will be noted, as shown in Fig. 2, that said threads 5 act as a joining or connecting means for the hose after the sleeve has been properly fixed therein, so that it is a means of precaution to provide said collar 11 to prevent injury to the threads which otherwise might prevent their use as a coupling means for a nipple, faucet, or other article to which it is desired to connect the hose.

It will thus be seen that by the turning of the bolt 6, the nipple will be forced within the end of the sleeve to cause the bifurcated portion to firmly embed in the hose, so that it cannot possibly pull out.

After the expansion has taken place, the bolt 6 and collar 11 are removed, and the connection is ready for service. I preferably form a portion of the band 12 angular, so that it may be turned with a wrench to cause it to forcibly engage and prevent thrust of the end of said hose.

Fig. 3 of the drawing shows the relative gripping action between the expanded portion of the sleeve and the eared portion of the nipple 8. In service, the opening 9 of the nipple 8 and the sleeve 2 form a passage for the fluid as it passes in either direction through the hose.

By allowing a certain number of the threads 5 to extend within the hose, the collar 12 is permitted to be tightly turned against the end of the hose, both acting to prevent thrust and to press the end portion of the hose into tight engagement with the outer surface of said sleeve 2.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A hose coupling including a sleeve designed to be inserted within the hose and having an expansible portion, means for expanding said portion within the hose, said sleeve throughout its entire length being capable of fitting within said hose, said sleeve also being threaded throughout a portion of its length, and a threaded band designed to be screwed on said threaded portion of the sleeve and to directly engage and compress the end of the hose, substantially as described.

2. A hose coupling including a sleeve designed to be inserted within the hose and having an expansible portion, means for expanding said portion within the hose, said sleeve throughout its entire length being capable of fitting within said hose, said sleeve also being threaded throughout a portion of its length, and a threaded band having a tapered recess designed to receive the end of the hose and compress it into contact with the outer surface of the sleeve, substantially as described.

3. A connecting device for hose, comprising a sleeve having a bifurcated portion designed to be placed within said hose, a nipple having a tapered outer surface, one end of said nipple being of smaller diameter than the inner diameter of the sleeve, the opposite end of said nipple being of larger diameter than the inner diameter of the sleeve, said nipple having an internal screw-thread extending therethrough, and means operative to engage the internal screw-thread of the nipple to pull said nipple into the sleeve and thereby expand the bifurcated portion into engagement with the internal surface of the hose, said sleeve having a screw-threaded portion designed to extend out of said hose, and a band designed to be screwed onto said screw-threaded portion, said band having a tapered recess designed to engage and compress the end of said hose in contact with said sleeve, substantially as described.

4. A connecting device for hose, comprising a sleeve having a bifurcated portion designed to be placed within said hose, a nipple having a tapered outer surface, one end of said nipple being of smaller diameter than the inner diameter of the sleeve, the opposite end of said nipple being of larger diameter than the inner diameter of the sleeve, said nipple having an internal screw-thread extending therethrough, and a bolt operative to engage the internal screw-thread of the nipple to pull said nipple into the sleeve and thereby expand the bifurcated portion into engagement with the internal surface of the hose, said sleeve having a screw-threaded portion designed to extend out of said hose, and a band designed to be screwed onto said screw-threaded portion, said band having a tapered recess designed to engage and compress the end of said hose in contact with said sleeve, substantially as described.

In testimony whereof I have signed my name to this specification in the presence of two subscribing witnesses.

NICHOLAS FURDUY.

Witnesses:
  RHODA E. GILLIES,
  CHAS. E. POTTS.